United States Patent [19]

Thompson

[11] Patent Number: 5,087,204
[45] Date of Patent: Feb. 11, 1992

[54] TAXIDERMIC EYE-MOUNTING METHOD AND ARTICLE

[76] Inventor: James M. Thompson, P.O. Box 130, Lovejoy, Ga. 30250

[21] Appl. No.: 495,370

[22] Filed: Mar. 19, 1990

[51] Int. Cl.$^5$ ................................. G09B 23/00
[52] U.S. Cl. .................... 434/296; 434/295; 434/271; 446/392
[58] Field of Search .............. 434/295–297, 434/271; 446/392, 301, 391

[56] References Cited

U.S. PATENT DOCUMENTS

| | | | |
|---|---|---|---|
| 4,477,500 | 10/1984 | Powell | 446/392 X |
| 4,735,752 | 4/1988 | Negethon | 434/296 X |
| 4,789,341 | 12/1988 | Czyzewski | 434/296 |

Primary Examiner—Richard J. Apley
Assistant Examiner—J. Doyle
Attorney, Agent, or Firm—Michael V. Drew

[57] ABSTRACT

A taxidermic eye-mounting method wherein moist paper-mache or the like is stuffed through the eye opening of a hallowed-out animal head such as a fish head. A slightly flexible eye socket of substantially rigid material which has been molded to receive an artificial eye is set in the eye opening in the moist paper-mache. A fish eye is popped into the eye socket after the paper-mache has dried. The eye socket is formed to resemble the eye lid and eye membrane of an open animal eye such as an open fish eye. The socket may be made by a method of forming a moldable, pliable, non-hardening material around the animal eye to create a model which emulates the eye lid and eye membrane of an open animal eye such as an open fish eye.

2 Claims, 2 Drawing Sheets

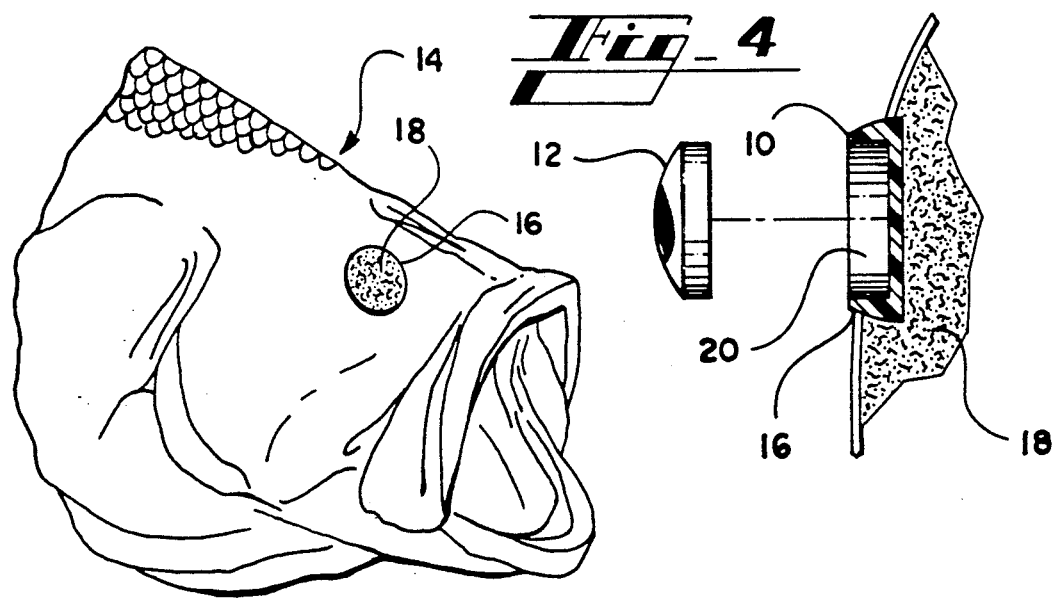
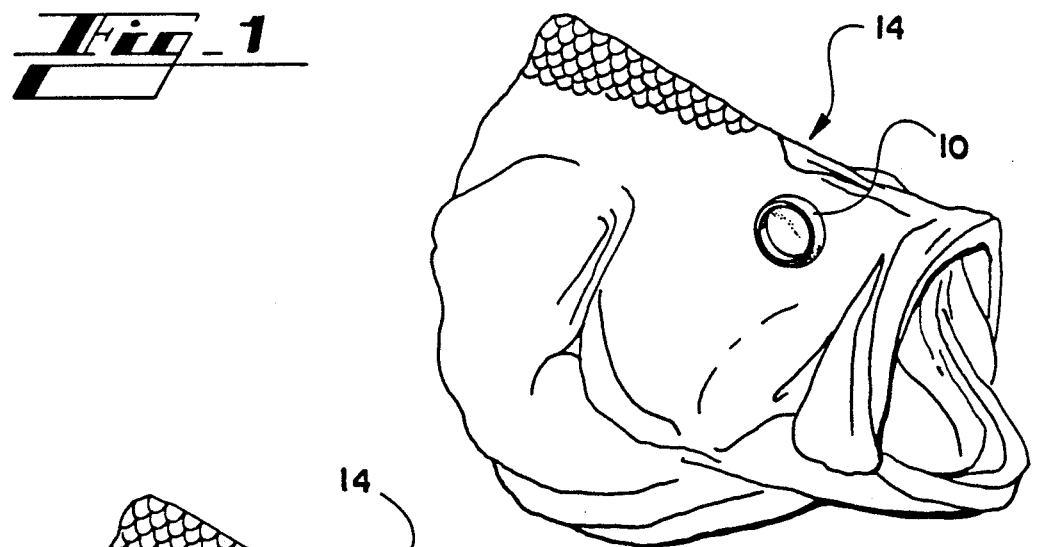
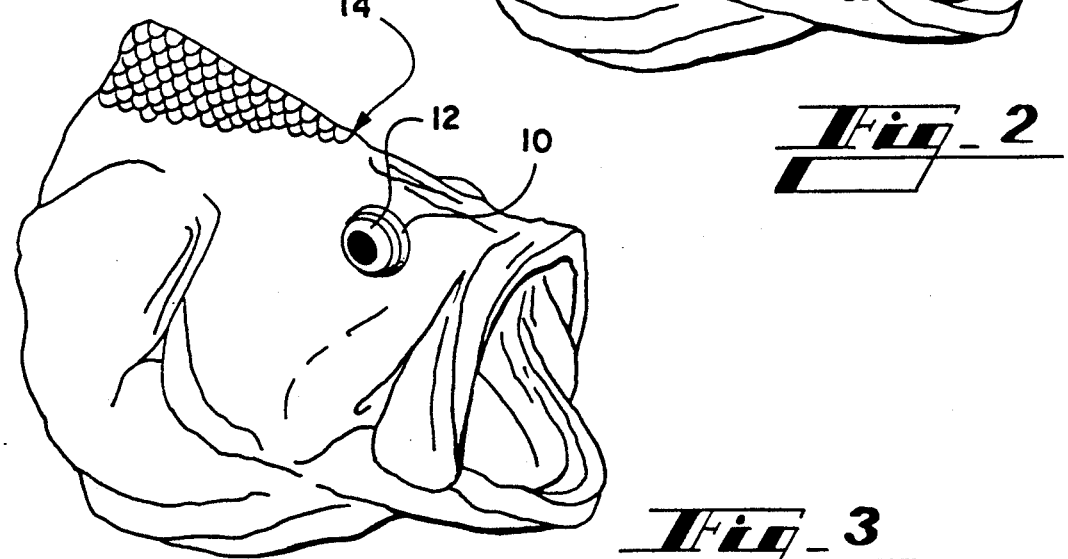

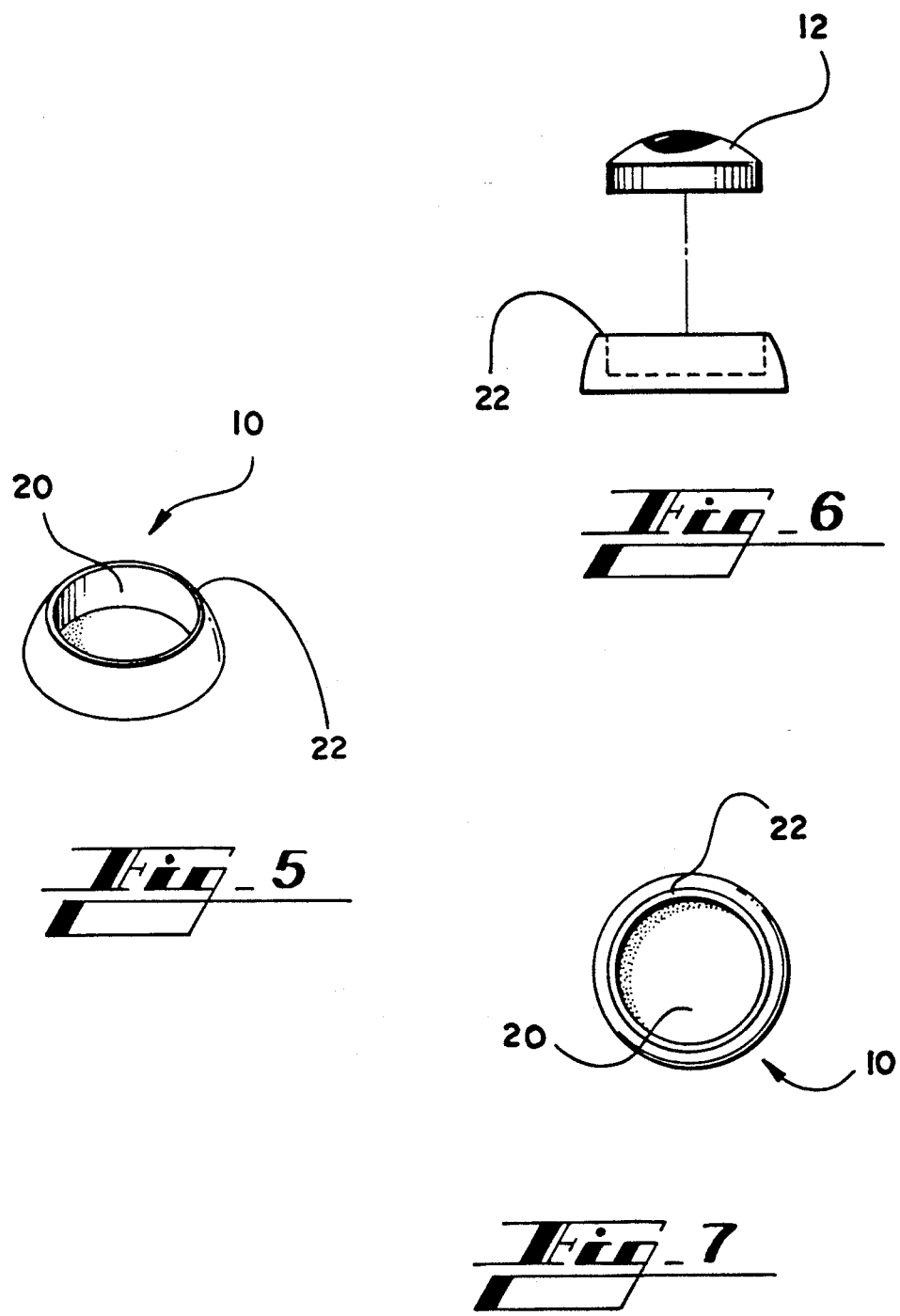

TAXIDERMIC EYE-MOUNTING METHOD AND ARTICLE

TECHNICAL FIELD OF THE INVENTION

This invention relates generally to taxidermy, and more particularly to, taxidermic methods for mounting eyes, and even more particularly, to taxidermic methods for mounting eyes in fish heads.

BACKGROUND OF THE INVENTION

A primary objective of taxidermy is to prepare, stuff and mount the skins of animals so that they appear to be life-like. The mounting of an eye in the head a taxidermic model is especially important. Because the head and eyes are often the primary focus of the viewer, if the eyes are not mounted properly, the finished product will not appear life-like.

Mounting eyes in an animal such as a fish is particularly troublesome because the head of the animal is essentially hollowed out in the mounting process. A current known method of mounting eyes in a fish head is time consuming and does not readily provide for a life-like setting. By this current method, putty is placed in the eye opening of the hollowed-out fish head. An artificial fish eye is then placed in the opening and pushed into the putty. Additional putty is filled in around the eye to resemble the eye lid and eye membrane. The area around the fish eye, or the entire fish, is then painted. As a last step, excess paint must be removed from the fish eye ball. The location of the eye ball in the putty and the scraped, painted putty often do not give the life-like appearance which is desired. Thus, it can be appreciated that it would desirable to have a method for mounting eyes in an animal skin such as a fish which would be quick, efficient, and result in a life-like appearance.

BRIEF SUMMARY OF THE INVENTION

An object of the invention is to provide a quick, efficient and reliable taxidermic method for mounting eyes in an animal skin such as a fish.

A further objective of the invention is to provide a taxidermic method of mounting eyes in an animal skin such as a fish which results in a very life-like appearance.

The present invention teaches a taxidermic eye-mounting method of stuffing moist papier-mache or similar formable, moldable material through the eye opening of a hollowed-out animal head such as a fish head. Sufficient papier-mache is stuffed into the eye opening to fill in the area behind the eye opening. A slightly flexible eye socket made of substantially rigid material, such as a plastic, which has been molded to receive an artificial eye is set in the eye opening in the moist papier-mache in the proper position. Excess papier-mache is wiped away while the material is still moist. The papier-mache is allowed to dry. The entire fish skin, including the area around the eye, may then be painted and any other desired finish applied. Upon painting, the socket has the realistic appearance of a fish eye lid and eye membrane. As a final step, the fish eye is popped into the socket.

The socket into which the fish eye is inserted is formed to resemble the eye lid and eye membrane of an open fish eye.

Other aspects, objects, features and advantages of the present invention will become apparent to those skilled in the art upon reading the detailed description of a preferred embodiment in conjuction with the accompanying drawings and appended claims.

BRIEF DESCRIPTION OF THE ACCOMPANYING DRAWINGS

FIG. 1 is an illustration of the taxidermic eye-mounting method embodying the teachings of the present invention. A fish head upon which the invention is practiced is shown.

FIG. 2 is an illustration of the fish head and invention shown in FIG. 1, also showing an eye socket embodying the teachings of the present invention.

FIG. 3 is an illustration of the fish head and invention shown in FIG. 2, also showing a fish eye.

FIG. 4 is an illustration of a portion of the fish head and teachings of the present invention which are shown in FIGS. 1, 2, and 3.

FIG. 5 is an isometric view of a fish eye socket embodying the teachings of the invention.

FIG. 6 is an elevational view of the invention of FIG. 5, shown with an eye inserted.

FIG. 7 is a top view of the invention of FIG. 5.

DETAILED DESCRIPTION OF A PREFERRED EXEMPLARY EMBODIMENT

While the specification concludes with claims particularly pointing out and distinctly claiming the subject matter which is regarded as the present invention, it is believed that the invention will be better understood upon a review of the detailed description of exemplary embodiments which follows, taken in conjunction with the accompanying drawings.

Referring now to the drawings in more detail, each feature is denoted by the same numeral throughout the illustrations.

Referring to FIG. 1, therein is shown a fish head 14 which has been prepared for taxidermic mounting. Normally, in preparation for mounting, all of the meat, eyes and other decayable flesh and material is removed from the fish's skin. The fish skin and hollowed head area is then mounted on a manikin or other frame structure. In the method taught by this invention, moist papier-mache 18 is inserted through the eye opening 16 of the fish, into the cheeks and area behind the eye opening 16. The insertion of moist papier-mache 18 also serves to fill out the cheek area of the fish and other soft tissue parts which need to be filled out to present a life-like appearance. Papier-mache 18 works well for the purpose employed herein because it is inexpensive, extremely formidable, easy to work with, quick drying and thoroughly drying. The papier-mache 18 is inserted until it fills the area behind the eye opening 16.

Referring now to FIG. 2, a substantially rigid but slightly flexible eye socket 10 which emulates the eye lid and eye membrane of an open fish eye is set through the eye opening 16 into the papier-mache 18 while the papier-mache 18 is still moist. Since the moist papier-mache 18 is extremely formidable and adheres well to the eye socket 10, the eye socket 10 may be easily manipulated until it is set in the most life-like position. The skin of the fish head 14 may be easily pressed and formed while the papier-mache 18 beneath it is still moist, to achieve the optimum life-like effect. Excess papier-mache 18 may then be easily wiped away from the fish head 14 and eye socket 10. The papier-mache 18 is allowed to dry, thus fixing the eye socket 10 in place.

The entire fish and/or fish head 14 including the eye socket 10 may then be painted or otherwise finished as desired.

Referring now to FIG. 3, therein is shown an eye socket 10, according to a preferred embodiment of the invention, set in place through eye opening 16 of the fish head 14. As a final step in the method taught by the invention, a fish eye 12 may be easily inserted or popped into the cavity 20 of the eye socket 10. Once the fish eye 12 is popped into place, the eye mounting process is complete.

FIG. 4 illustrates through a sectional view, the manner in which the eye socket 10 rests embedded in the papier-mache 18, and the fish eye 12 is inserted into the eye socket 10.

FIG. 5 illustrates the mounted contour of the fish eye socket 10. The eye socket 10 is essentially a mound which has been contoured to resemble an eye lid and eye membrane of an open fish eye. FIGS. 5, 6, and 7 all illustrate the location of a cavity 20 in the socket 10. The cavity 20 is sized to receive a fish eye such as the fish eye 12 illustrated in FIGS. 3 and 4. Referring now to FIG. 6, therein is illustrated the depth of the cavity 20. The optimum depth is that which corresponds to the thickness of the fish eye 12 such that when the eye 12 is inserted into the cavity 20 the top, exposed portion of the fish eye 12 is aligned with the contour of the socket 10 to present a life-like look of a fish eye. When constructing the socket 10 of a substantially rigid by slightly flexible material such as plastic, the tolerance between the fish eye 12 and the cavity 20 may be made quite small while still allowing for manipulation of the eye 12 into the cavity 20 of the socket 10. The cavity opening 22 may be made just slightly smaller than the circumference of the fish eye 12 such that the flexibility of the socket 10 permits the fish eye to be easily pushed into the cavity 20 while also acting to firmly retain the fish eye 12 in the cavity 20 once inserted. An eye socket 10 constructed as described above enables a taxidermist to utilize the quick, efficient eye-mounting method described above and also helps to present a very life-like appearance for the mounted eye.

Although the mounting methodology and eye socket have been described with particular reference to a fish, all may be equally applied to other animals to be mounted in taxidermy having a hollow head.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A method for mounting an eye in a fish head which has been prepared for taxidermy mounting comprising:
   inserting papier-mache into an eye opening of the fish head;
   setting a substantially rigid but slightly flexible eye socket which emulates the eyelid and eye membrane of the fish into said eye opening and into said papier-mache;
   allowing said papier-mache to dry; and
   inserting the eye into said eye socket.

2. A method for mounting an eye in a hollowed-out animal head which has been prepared for taxidermy mounting comprising:
   inserting papier mache into an eye opening of the animal head;
   setting a substantially rigid but slightly flexible eye socket which emulates the eyelid and eye membrane of the animal into said eye opening and into said papier-mache;
   allowing said papier-mache to dry; and
   inserting the eye into said eye socket.

* * * * *